United States Patent [19]

Kanazawa

[11] Patent Number: 4,831,513
[45] Date of Patent: May 16, 1989

[54] MEMORY INITIALIZATION SYSTEM

[75] Inventor: Takashi Kanazawa, Tokyo, Japan

[73] Assignee: NEC Corporation, Tokyo, Japan

[21] Appl. No.: 77,900

[22] Filed: Jul. 27, 1987

[30] Foreign Application Priority Data

Aug. 6, 1986 [JP] Japan .................................. 61-184783

[51] Int. Cl.$^4$ ........................ G06F 12/00; G06F 11/00
[52] U.S. Cl. ..................................... 364/200; 371/12; 364/266.3; 364/243
[58] Field of Search ... 364/200 MS File, 900 MS File; 371/10, 12, 67

[56] References Cited

U.S. PATENT DOCUMENTS

| | | | |
|---|---|---|---|
| 4,236,207 | 11/1980 | Rado et al. ........................ | 364/200 |
| 4,342,084 | 7/1982 | Sager et al. ........................ | 364/200 |
| 4,493,026 | 1/1985 | Olnowich ........................... | 364/200 |
| 4,531,215 | 7/1985 | Ladewski et al. .................... | 371/67 |

Primary Examiner—Eddie P. Chan
Assistant Examiner—Joseph T. Fitzgerald
Attorney, Agent, or Firm—Foley & Lardner, Schwartz, Jeffery, Schwaab, Mack, Blumenthal & Evans

[57] ABSTRACT

A memory initialization system for initializing a memory content in response to a memory initialization instruction is disclosed. In this system, a memory initialization instruction validity control means for controlling validity of the memory initialization instruction is arranged. The memory initialization instruction validity control means can render the memory initialization instruction invalid so as to inhibit initialization for the memory.

2 Claims, 2 Drawing Sheets

MEMORY INITIALIZATION SYSTEM

BACKGROUND OF THE INVENTION

The present invention relates to a memory initialization system and, more particularly, to a memory initialization system for effectively performing an instruction retry in an information processing system consisting of a plurality of logical units.

In an information processing system consisting of a plurality of logical units each having a memory, each logical unit has a memory initialization circuit in correspondence with its memory. Each memory initialization circuit is connected to a common initialization instruction section. A common signal is simultaneously supplied from the initialization instruction section to the initialization circuits of the logical units, and the memories of the respective logical units are initialized each time the initialization instruction signal is sent from the initialization instruction section. However, assume that the logical units include those which require initialization of a memory only when the system is energized and those which require initialization of the memory upon instruction retry. In this case, if the initialization instruction signal is generated for initializing the memory of one of the logical units upon instruction retry, the memories of the logical units which do not require initialization are undesirably initialized. As a result, upon instruction retry of one of the logical units, save and restore processing of other logical units must be performed, and an instruction retry time is undesirably prolonged.

SUMMARY OF THE INVENTION

It is an object of the present invention to provide a memory initialization system which is free from the conventional drawbacks and can shorten the instruction retry time.

The memory initialization system of the present invention comprises: a plurality of logical units each having a memory and a memory initialization circuit for initializing the memory, and initialization instruction signal generating means for generating a memory initialization instruction signal common to the plurality of logical units, wherein at least one of the plurality of logical units comprises initialization instruction validity control means for, upon reception of the memory initialization instruction signal, discriminating validity of the memory initialization instruction signal based on a preset value to determine whether or not the memory initialization instruction signal is to be transferred to the memory initialization circuit.

DETAILED DESCRIPTION OF THE PREFERRED EMBODIMENT

An embodiment of the present invention will now be described in detail with reference to the accompanying drawings.

Figure 1:
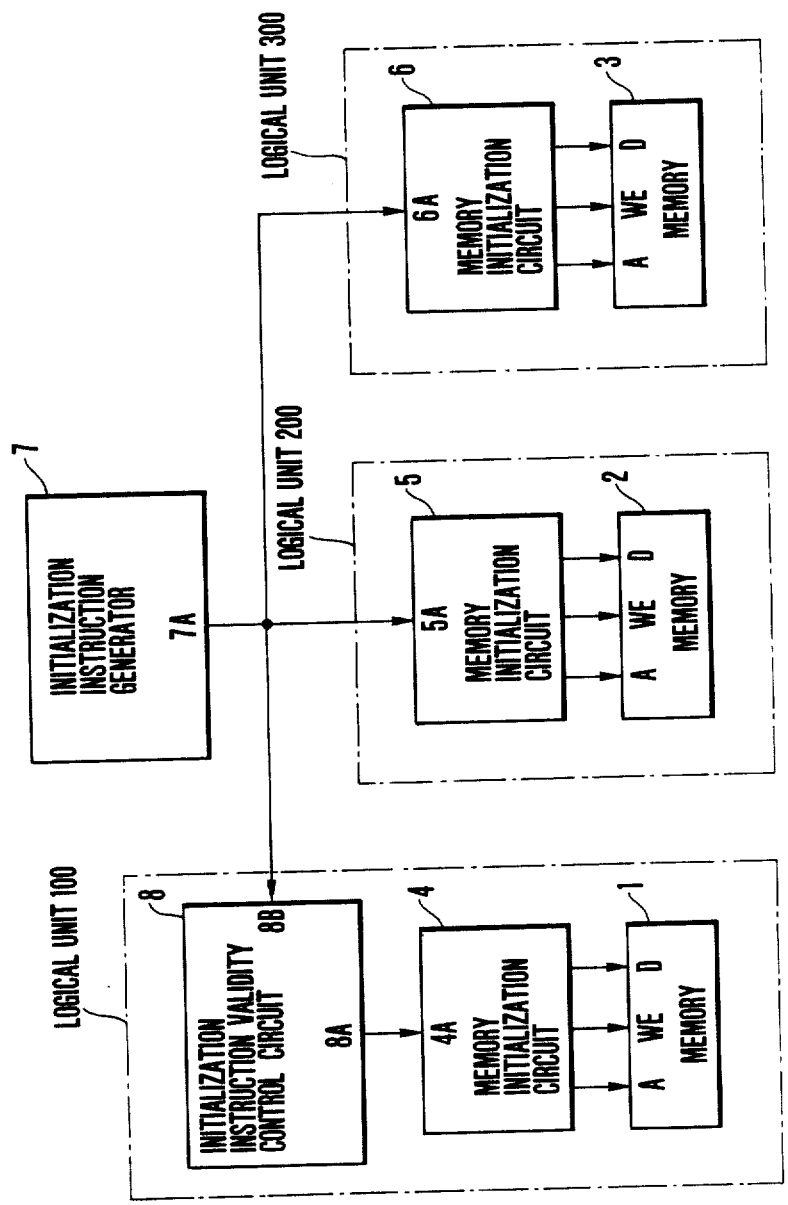
FIG. 1 is a block diagram showing a basic arrangement of the present invention.

FIG. 1 is a block diagram showing the basic arrangement of a memory initialization system according to the present invention.

Referring to FIG. 1, an initialization instruction generator 7 for generating a memory initialization instruction signal is commonly connected to logical units 100, 200, and 300. The logical units 100, 200, and 300 respectively have memories 1, 2, and 3, and memory initialization circuits 4, 5, and 6 corresponding to these memories.

In FIG. 1, address terminals A, write signal terminals WE, and data terminals D of the memories 1, 2, and 3 are connected to the corresponding memory initialization circuits 4, 5, and 6. When the memory initialization circuits 4, 5, and 6 receive the memory initialization instruction signal at their input terminals 4A, 5A, and 6A, respectively, they initialize the corresponding memories 1, 2, and 3. The input terminals 5A and 6A of the memory initialization circuits 5 and 6 are connected to an output terminal 7A of the initialization instruction generator 7 as in the prior art system, and is directly controlled by the initialization instruction signal from the output terminal 7A. However, the input terminal 4A of the memory initialization circuit 4 is connected to an output terminal 8A of an initialization instruction validity control circuit 8 (to be described later). An input terminal 8B of the initialization instruction validity control circuit 8 is connected to the output terminal 7A of the initialization instruction generator 7. More specifically, only the memory initialization circuit 4 is controlled not by the initialization instruction signal from the initialization instruction generator 7 but through the initialization instruction validity control circuit 8. Therefore, if the initialization instruction signal is generated from the initialization instruction generator 7 when the memory 1 does not require initialization, the memories 2 and 3 are forcibly initialized. However, in this case, the memory 1 can be initialized or initialization therefor can be inhibited under the control of the initialization instruction validity control circuit 8.

Figure 2:
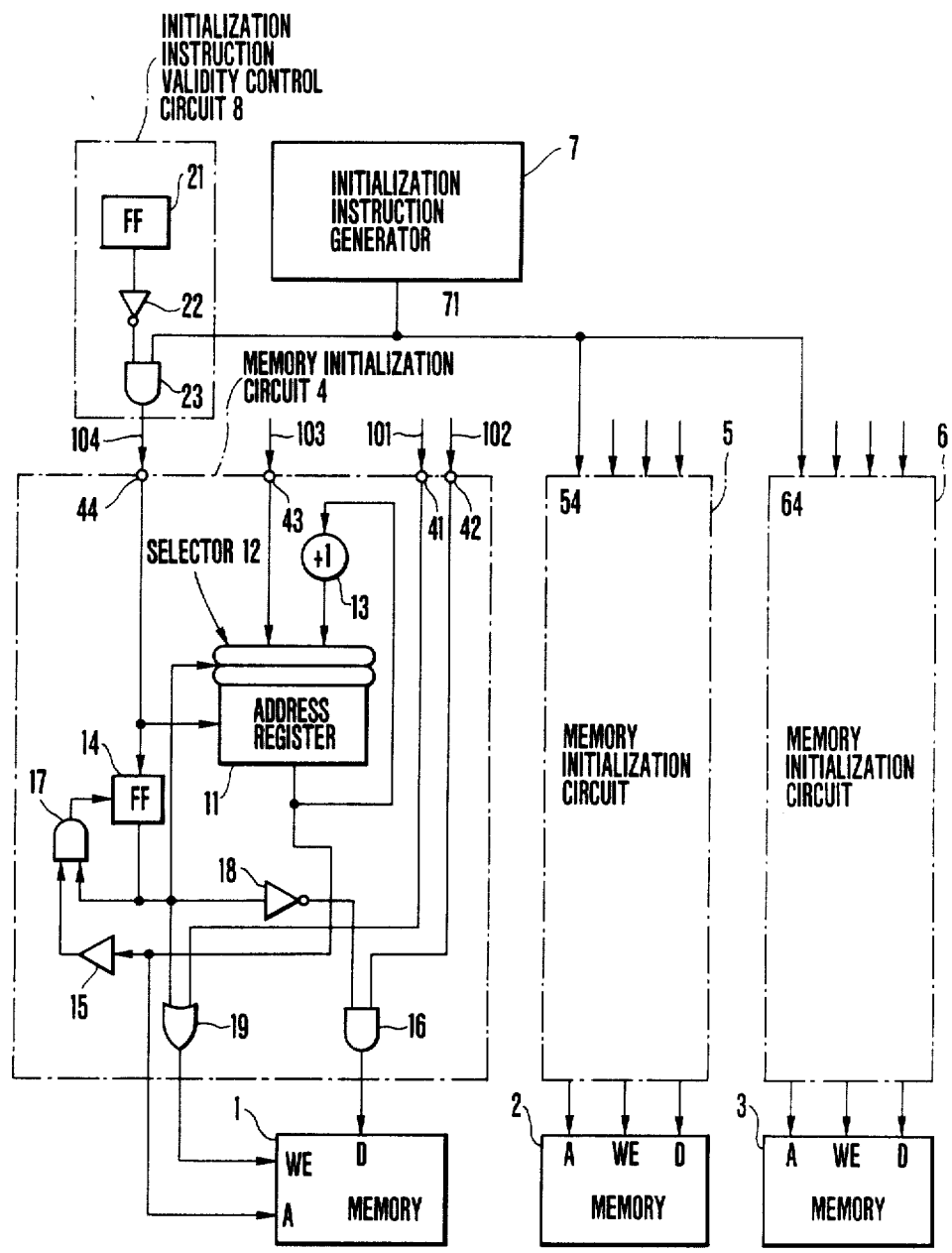
FIG. 2 is circuit diagram showing the circuit in FIG. 1 in more detail.

FIG. 2 shows in detail the memory initialization circuits 4, 5, and 6, and the initialization instruction validity control circuit 8 shown in FIG. 1. Note that the arrangement of the memory initialization circuits 4, 5, and 6 is known to those skilled in the art, and only the memory initialization circuit 4 is shown.

Input terminals 41, 42, and 43 of the memory initialization circuit 4 are connected to a control circuit (not shown), and respectively receive a normal write instruction signal 101, data signal 102, and address signal 103. An input terminal 44 of the memory initialization circuit 4 receives a memory initialization instruction signal 104 from the output terminal of the initialization instruction validity control circuit 8.

An address register 11 supplies the address signal 102 selected by a selector 12 or an output from an incrementer 13 to the address terminal A of the memory 1. A flip-flop 14 is set by the output signal from the initialization instruction validity control circuit 8 (to be described later), and is reset by a signal indicating all "1" bits of the address register 11 input from the address register 11 through a detector 15 and one input terminal of an AND gate 17. Then, the flip-flop 14 supplies a selection signal to the selector 12. The output terminal of tee flip-flop 14 is also connected to the other input terminal of the AND gate 17, the input terminal of an inverter 18, and one input terminal of an OR gate 19. The other input terminal of the OR gate 19 receives the write instruction signal 10.. The output terminal of the OR gate 19 is connected to the write terminal WE of the memory 1. The output from the inverter 18 and the data signal 102 are input to an AND gate 16, and the output from the AND gate 16 is connected to the data input terminal D of the memory 1.

The initialization instruction validity control circuit 8 as the characteristic feature of the present invention comprises a flip-flop 22 for validating or invalidating an initialization instruction, an inverter 22 for inverting the output signal from the flip-flop 21, and an AND gate 23 for calculating a logical product between the output from the inverter 22 and the initialization instruction signal 71 from the initialization instruction generator 7, and for supplying its output to the flip-flop 14 of the memory initialization circuit 4.

The operation of the system shown in FIG. 2 will now be described.

When the flip-flop 21 of the initialization instruction validity control circuit 8 is set at level "0", since the AND gate 23 is enabled by the output from the inverter 22, the initialization instruction signal 71 from the initialization instruction generator 7 is supplied to the initialization circuit 4 corresponding to the memory 1 through the AND gate 23, and is also supplied to the initialization circuits 5 and 6 corresponding to the memories 2 and 3. The flip-flop 14 is set at level "1", and the address register 11 is cleared. Then, the output from the OR gate 19 goes to level "1" regardless of the write instruction signal 101. The input terminal WE of the memory 1 goes to level "1" and sets the memory 1 in the write enable state.

When the output from the flip-flop 14 goes to level "1", the selector 12 selects the output from the incrementer 13 as an input for the address register 11.

The output from the inverter 18 goes to level "0", and the write data 102 cannot pass through the AND gate 16. Therefore, data "0" is written at an address of the memory 1 corresponding to the output "0" of the address register 11.

The output "0" from the address register 11 is incremented by +1 by the incrementer 13, and the content of the address register 11 is incremented by +1. Therefore, data "0" is written at address 1 of the memory 1. Thereafter, the content of the address register is incremented by +1, and data "0" is written at the addresses of the memory 1 indicated by the outputs from the address register 11. This operation is repeated until data "1" are written at all the bit positions of the address register 11.

When the detector 15 detects that all the bit positions of the address register 11 are "1", the output from the AND gate 17 goes to level "1", and the flip-flop 14 is reset, so that its output goes to level "0". Thus, the OR gate 19 allows the write instruction signal 101 to pass therethrough, and the memory 1 is then controlled by the write instruction signal 101. At the same time, since the output from the inverter 18 goes to level "1", the write data 102 is allowed to pass through the AND gate 16, and is input to the data terminal D of the memory 1. The selector 12 selects the address signal 103 as the input for the address register 11. In the memory 2 and the initialization circuit 5, and in the memory 3 and the initialization circuit 6, the same operation as described above is parallel-performed by the initialization instruction signal 71 directly input from the initialization instruction generator 7, and the memories 1, 2, and 3 are initialized.

When the flip-flop 21 of the initialization instruction validity control circuit 8 is set at "1", even if the initialization instruction generator 7 generates the initialization instruction signal 71, the signal 71 cannot pass through the AND gate 23. Therefore, the memories 2 and 3 are initialized but the initialization of the memory 1 is inhibited.

Therefore, the present invention is effective when the memories 2 and 3 require initialization not only upon system energization, but also upon instruction retry. The memory 1 requires initialization only upon system energization but does not require it upon instruction retry. More specifically, when the flip-flop 21 is set at "0" upon system energization and is set at "1" upon instruction retry, the memories 1 to 3 are initialized upon system energization but only the memories 2 and 3 are initialized upon instruction retry.

In the above embodiment, the initialization instruction validity control circuit 8 is provided to only the memory 1. However, the initialization instruction validity control circuit 8 can be provided to other memories 2 and 3 as needed.

According to the present invention as described above, a validity control section for an initialization instruction of a memory content is provided in correspondence to a predetermined memory to allow control of validity and invalidity of the initialization instruction. A memory which only requires initialization upon system energization can be initialized upon system energization. Therefore, save and restore processing upon instruction retry is not required for such a memory, and an instruction retry time can be shortened.

What is claimed is:

1. A memory initialization system comprising:
    a plurality of logical units each having a memory and a memory initialization circuit for initializing said memory in response to a memory initialization instruction signal common to said plurality of logical units; and
    initialization instruction signal generating means for generating the memory initialization instruction signal to commonly supply it to said plurality of logical units;
    at least one of said plurality of logical units which does not require initialization upon an instruction retry including initialization instruction validity control means for inputting the memory initialization instruction signal from said initialization instruction signal generating means and discriminating validity of the memory initialization instruction signal based on a preset to allow and inhibit transfer of the memory initialization instruction signal to said corresponding memory initialization circuit of said at least one of said plurality of logical units when the memory initialization instruction signal is discriminated to be valid or invalid, respectively, so as to avoid undesirable delay associated with the initialization of said memory of said at least one of said plurality of logical units which does not require initialization upon instruction retry; and
    other logical units being initialized every time the memory initialization instruction signal is generated from said initialization instruction signal generating means.

2. A system according to claim 1, wherein said initialization instruction validity control means has means for outputting one of two logical values depending on whether the corresponding memory requires initialization, and an AND gate for receiving outputs from said outsetting means and said initialization instruction signal generating means and supplying an output to said memory initialization circuit.

* * * * *